April 30, 1957 P. W. HARLAND 2,790,617
MOUNTING MEANS FOR MEASURING INSTRUMENT
Filed Jan. 12, 1953 2 Sheets-Sheet 1
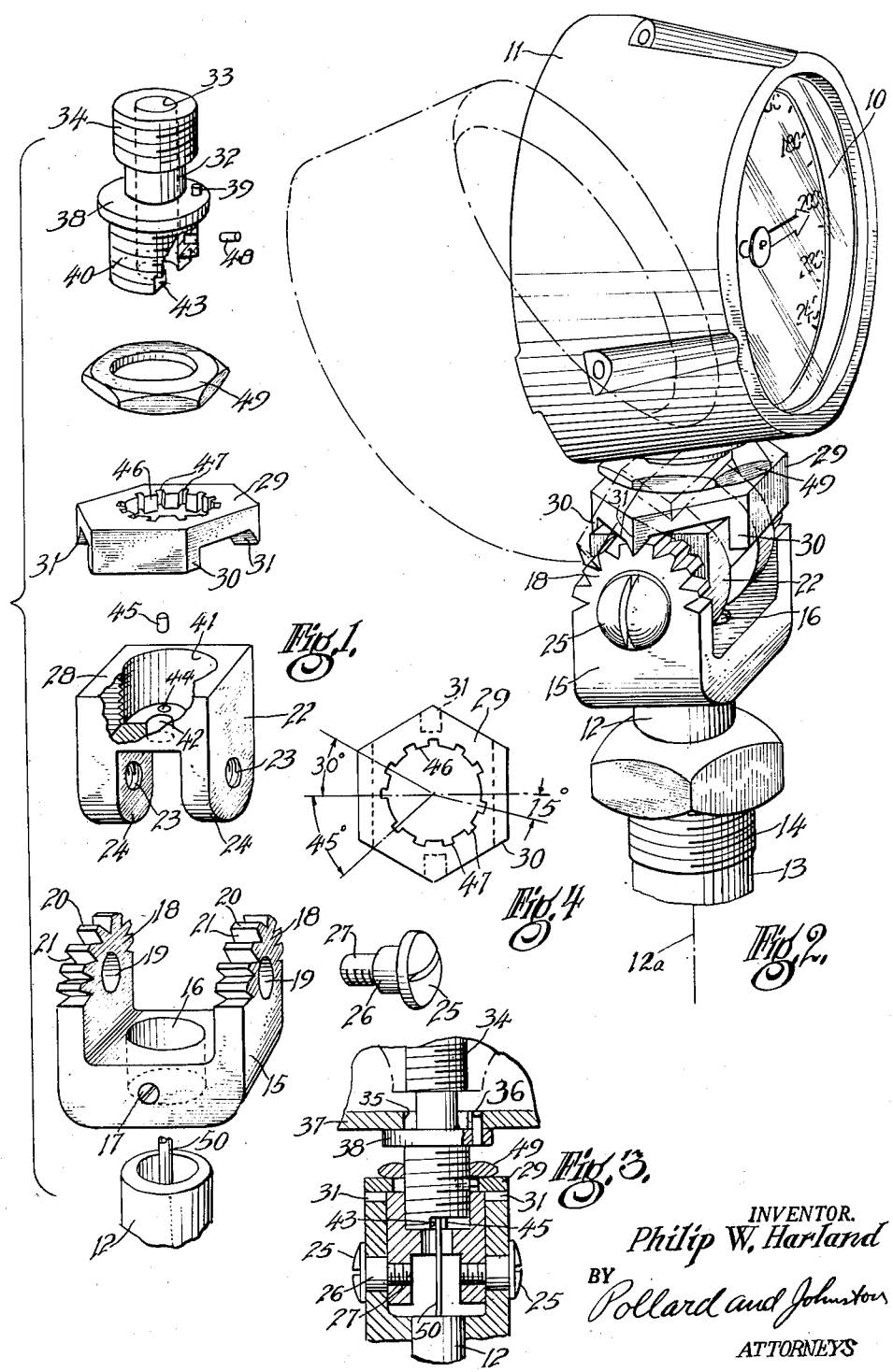
INVENTOR.
Philip W. Harland
BY
Pollard and Johnston
ATTORNEYS

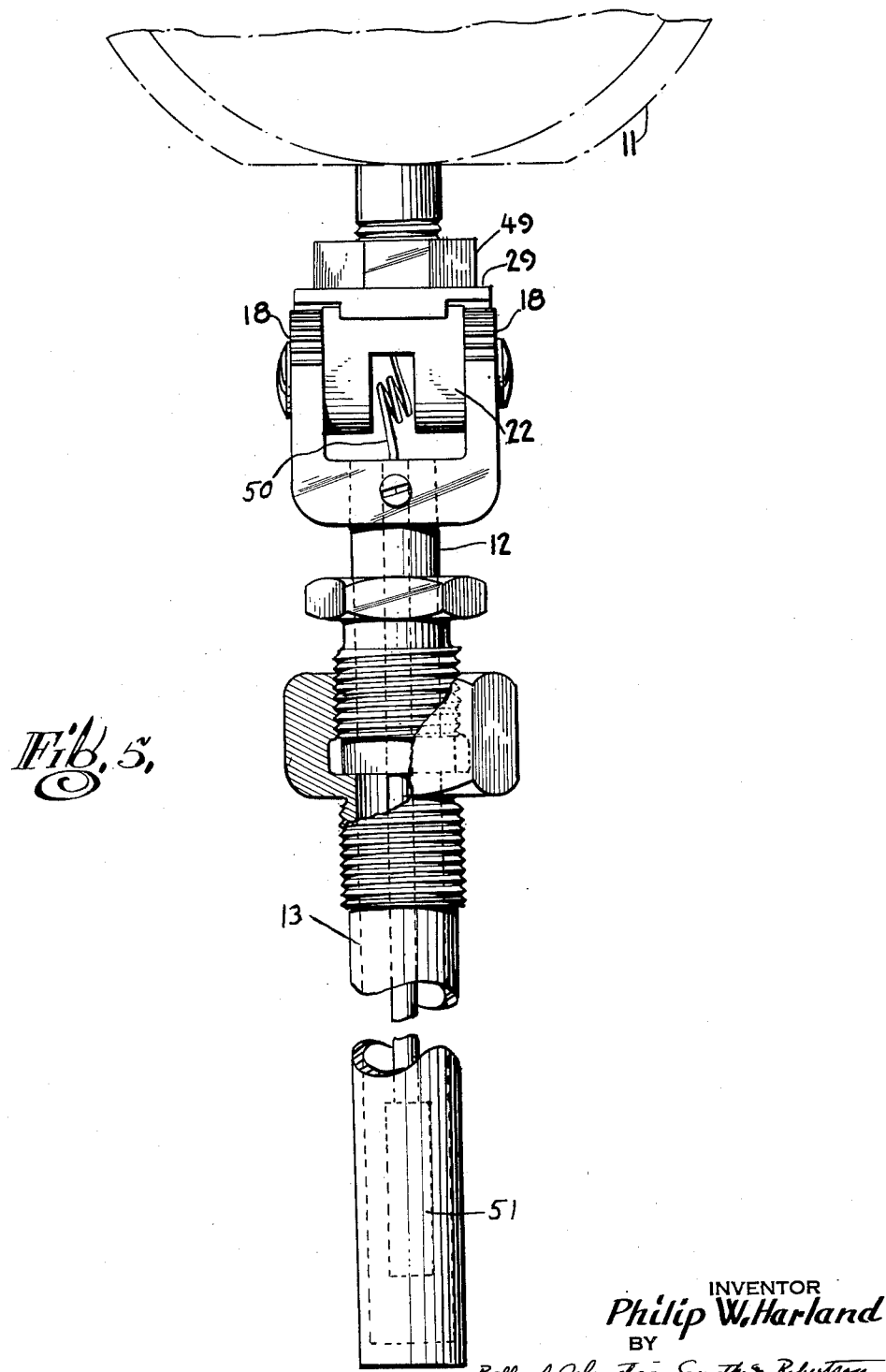

United States Patent Office 2,790,617
Patented Apr. 30, 1957

2,790,617
MOUNTING MEANS FOR MEASURING INSTRUMENT

Philip W. Harland, Sellersville, Pa., assignor to American Machine and Metals, Inc., Sellersville, Pa., a corporation of Delaware Application January 12, 1953, Serial No. 330,758

6 Claims. (Cl. 248—278)

This invention relates to new and improved mountings for measuring instruments, especially for instruments that are movable relative to their supporting elements.

Measuring instruments must be positioned so that the scale can be viewed by the reader. It often happens that fixed angle measuring instruments cannot be placed at suitable positions for reading. Moreover, fixed angle instruments offer convenient reading from one established station relative to the housing or structure in which the instrument is to be mounted, but cannot be adjusted for permitting reading at other stations relative thereto. Adjustable-angle instruments have been introduced into the art as a solution to this problem, but known adjustable-angle instruments have not been satisfactory because such instruments have a tendency to become dislodged from their set positions, sometimes because the weight of the indicator head acts as a force tending to dislodge the head, and often because wear on the parts prevents tight connections. Also, vibration may cause change of position. Furthermore, these instruments cannot be selectively set to positively predetermined positions.

It is an object of this invention to provide an improved adjustable-angle measuring instrument which is easily adjusted to positively predetermined angular positions relative to its supporting element. A special feature of the improved construction lies in its ability to safeguard flexible connecting tubes against excessive bending and twisting.

Another object of this invention is the provision of an improved holding member for an adjustable angle measuring instrument by which the measuring instrument can be securely locked in position against movement in any direction.

According to this invention, the indicator head of a measuring instrument is joined with its supporting stem by a pivot connection which permits movement of the head about a fixed axis, which may be approximately perpendicular to the longitudinal axis of the supporting stem, so that the relation of the plane of the indicator head with reference to the longitudinal axis of the supporting stem can be varied. In this way, the plane of the indicator head may assume positions on either side of the stem longitudinal axis, or a position in line therewith. As the indicator head is moved about the aforementioned pivot or fixed axis, it may be selectively set at positively predetermined positions relative to said stem axis by a positioning member which acts with cooperating elements on said pivot connection. Dislodgement of the indicator head from a set position may be prevented by locking the positioning member in place after the head has been set at such position. In addition to the foregoing adjustment relative to the longitudinal axis of the stem, the indicator head is movable angularly on a swivel about an axis perpendicular to said fixed pivot axis in order to adjust the facing of the indicator head relative to the pivot connection. The swivel is also movable to selective angular positions in which it is positively, non-rotatably held. During adjustment, rotational movement of the swivel is limited to approximatley 180° in order to prevent excessive bending and twisting of a flexible tube connecting the condition responsive element of the measuring instrument with the variable being measured. In the event that the condition responsive element is outside the measuring instrument, as in a thermometer, the flexible tubing connects the condition responsive element with the indicator element of the measuring instrument.

In the preferred embodiment, the pivot connection includes a fixed member secured to the stem of the measuring instrument and a movable member carrying the indicator head. The movable member is rotatably supported on screws or pins journaled in the fixed member for movement about an axis defined by the screws or pins. A tubular adapter threaded at opposite ends is secured at one end to the indicator head casing. The other end is received into a tapped socket in the movable member of the pivot connection and at right angles to the axis defined by the supporting screws or pins to form a swivel connection for turning the indicator head about an axis perpendicular to the pivot axis. A centrally-apertured plate is loosely mounted for axial and rotational movement on the adapter between the indicator head casing and the movable member. This plate has protruding detents which can be selectively inserted into a series of notches formed in the fixed member of the pivot connection for positively setting the indicator head at positions relative to the longitudinal axis of its supporting stem. The plate also defines a plurality of predetermined swivel positions in which the indicator head can be selectively set. More particularly, a radially extending protrusion is formed on the tubular adapter, and can be selectively set in any of a plurality of axial extending grooves formed in the plate around the adapter. Thus, by raising the plate so that the detents are clear of the notches and so that the protrusion on the adapter is disengaged from the plate, the indicator head can be freely pivoted and swiveled. By coordinated movements of the indicator head and the plate, the detents can be set into selected notches and the radially extending protrusion can be set into a selected groove, thereby positively positioning the head at a desired position relative to the stem supporting it. A locking nut threaded on the adapter is operable to lock the centrally apertured plate in set position. The limitation on swivel movement is provided by an abutment which can be set in position to restrict rotation of the adapter in the tapped socket of the movable member to approximately 180° or other suitable angle.

These and other objects, features and advantages of the invention will become apparent from the following detailed description of the drawings which are merely exemplary.

In the drawings:

Figure 1 is an exploded view of the operating parts of an instrument mounting embodying this invention;

Figure 2 is a perspective view of an adjustable angle vapor tension thermometer incorporating the mounting assembly of Figure 1;

Figure 3 is a detailed sectional view of the assembled mounting unit used in the thermometer shown in Figure 2; and Figure 4 is a plan view of one of the operating parts of the invention.

Figure 5 is a front elevation of the invention with portions thereof broken away.

The invention is illustrated as applied to a vapor tension thermometer, although it is to be understood that the improved mounting unit may support other forms of measuring instruments. In Figure 2 and indicating dial 10 of a thermometer is encased in an indicator head 11, which is connected to a rigid supporting stem 12 in a manner described hereinafter. The free end of the stem carries a casing 13 for holding a temperature responsive bulb, and is threaded at 14 so that when the bulb is installed in an enclosure containing the variable whose temperature is to be measured, the thermometer can be directly attached to such enclosure by screwing the free end of the stem into a tapped socket in the wall of such enclosure.

The indicator head 11 is joined to supporting stem 12 by a pivot connection which allows variation in the relative position of the indicator head with reference to the longitudinal axis, indicated at 12a, of the supporting stem. The pivot connection includes a U-shaped member 15 which has a longitudinal extending bore 16 for receiving one end of supporting stem 12. Member 15 is fixed to stem 12 by set screw 17. Each leg 18 of U-shaped member 15 has a bore 19 extending transversely therethrough, and a semi-circular end 20 formed with a series of peripherally-spaced, transversely extending notches 21. The notches are preferably spaced 15° apart, but have not been shown as such in order to illustrate them more clearly. The pivot connection further includes inverted U-shaped member 22 having legs 24—24 with tapped bores 23—23 extending transversely therethrough. The bores of each member are aligned.

Member 22 is pivotally mounted on member 15 in the following manner. Member 22 fits between legs 18—18 of member 15, and its legs 24—24 are secured to legs 18—18 by machine screws 25—25, which define the pivot axis for the indicator head 11. The shank of each screw has an enlarged diameter portion 26 on which the leg 18 is loosely received, and a threaded portion 27 of reduced diameter which screws into the tapped bore 23 of leg 24.

Overlying a flat, rectilinear surface 28 on the bight of the inverted U-shaped member 22 is a hexagonal plate 29 having flanges 30—30 depending from two opposing sides thereof. A pair of aligned detents 31—31 protrude from the corners remote from flanges 30—30, and can be inserted into any selected pair of aligned notches 21—21 on legs 18—18. The plate is movable between raised positions in which member 22 can be freely pivoted about its axis and a lowered operative locking position in which the plate rests on the surface 28. In the latter position the detents 31—31 extend into a pair of aligned notches 21—21 so as to fix the angle of the indicator head relative to the axis of the stem, and the flanges 30—30 extend along and cooperate with opposite sides of member 22 so as to prevent rotation of plate 29 relative to member 22.

The connection between member 22 and indicator head 11 comprises adapter 32 having a longitudinally extending bore 33. One end 34 of the adapter fits through an opening 35 in the indicator head casing 37, and is threaded for receiving a nut (not shown). Axially spaced along the adapter's longitudinal axis is a radially extending flange 38 having a diameter larger than the diameter of aperture 35. The flange carries an offset, axially extending key or pin 39 which is received in an opening 36 in casing 37 so as to prevent rotation of the adapter relative to the indicator head. When a nut is screwed and tightened on the end 34, the flange 38 fits firmly against the outer surface of casing 37 so as to effect a secure connection.

The free end 40 of the adapter is also threaded and screws into a tapped, longitudinally extending bore 41 in the bight of member 22. With this form of construction, the indicator head 11 is swiveled in the member 22 so that it can be turned angularly about an axis perpendicular to the pivot axis defined by screws 25—25. The bight of the member 22 is further provided with a smaller diameter bore 42 along the longitudinal axis thereof for a purpose described hereinafter.

Plate 29 is provided with a central, circular aperture 46, and is loosely mounted on threaded portion 40 of the adapter for axial and rotary movement relative thereto to and from its operative position. The plate is formed with a plurality of axially extending grooves 47 spaced around aperture 46. These grooves define selective facing positions in which the indicator head 11 may be set. As clearly shown in Figure 4, the grooves are spaced 30° apart, except for two 45° intervals. Although the minimum spacing between any two grooves is 30°, the indicator head can be set at 15° intervals along almost the entire inner periphery of the aperture 46. Such positioning is effected by rotating the plate 180° to reverse the position of the plate 29 on member 22, so that the grooves will define a plurality of positions displaced 15° from the positions previously defined, although at two places the minimum interval will be 30°. When the plate 29 is raised from its operative position, the swivel member 40 may be turned in socket 41 until a pin 48 projecting radially from member 40 is aligned with the groove corresponding to the facing position selected. Thus, when the plate is lowered, the pin 48 extends into such groove and holds the swivel in this selected position.

A locking nut 49 screws on threaded portion 40, and can be appropriately tightened or loosened to lock or unlock plate 29.

As shown in Figures 1 and 3, the end surface of the threaded portion 40 is cut-away so as to form a protruding segment 43. In the member 22, an offset bore 44 parallel to bore 42 receives a pin 45. The pin extends through this bore, and projects into bore 41 and into the path of movement of the segment 43 so as to limit the rotation of the movement of the swivel to approximately 180°. This construction is important because a flexible capillary tube 50 extends through the tubular stem 12, bore 42 in member 22 and bore 33 in the adapter 32, from a temperature responsive bulb 51 in casing 13 to the interior of the indicator head. By such construction, excessive bending and twisting of the tube 50 are prevented.

From the foregoing, it can be seen that if the position of the indicator head 11 with respect to its supporting stem 12 is inconvenient for observation of the dial face 10, the thermometer can be conveniently adjusted relative to this stem in the following manner. The locking nut 49 is loosened in order to permit movement of the plate 29 away from its operative position. The plate 29 is then raised so that the detents 31 are withdrawn from notches 21 and so that the flanges 30 are raised clear of the member 22. In this manner, member 22, together with the indicator head 11, is freely swingable about the pivot axis defined by screws 25. At the same time the detents are withdrawn from the notches, the radially extending pin 48 on the swivel member 40 is disengaged from the plate 29 because the grooves 47 are raised free and clear of the pin 48. With the plate 29 in a raised position relative to the member 22, the indicator head can be moved freely about the pivot axis defined by screws 25 and it can be also rotated through an arc approximately 180° or other suitable angle about an axis perpendicular to the axis defined by such screws. The head is then reset by lowering the plate into its operative position to insert the detents into selected notches and to receive pin 48 into a selected groove 47. In this manner, the indicator head can be selectively set and held at positively predetermined positions by the single plate 29, which prevents movement about the pivot and prevents rotation on the swivel. After the head has been set at the desired position, the nut 49 may then be tightened to hold the plate 29 in its operative position.

It is to be understood that the detailed description and the accompanying drawings are illustrative and that the invention herein disclosed may be embodied in various forms of construction within the scope of the appended claims, as will be apparent to those skilled in the art.

What is claimed is:

1. Mounting means for a measuring instrument having an indicator head and a rigid supporting stem for said head, said means including pivot means between said indicator head and said stem for moving said indicator head about a fixed axis to vary the relation of the indicator head with reference to the axis of said supporting stem so that the indicator head may assume positions on either side of said stem axis, or a position in line therewith, positioning means including a movable element associated with said pivot means for selectively setting the indicator head at positively predetermined positions relative to said stem, swivel means connecting said indicator head with said pivot means for allowing rotation of said head realtive to said pivot means about an axis perpendicular to said fixed axis, said movable element having means thereon associated with said swivel means for setting said head at predetermined facings relative to said pivot means, and single locking means for holding said positioning means in place to prevent dislodgement of said pivot means and said swivel means.

2. Mounting means for a measuring instrument having an indicator head and a rigid supporting stem for said head, said means comprising a pair of U-shaped members, one of said members being fixed on said stem and having legs which overlap the legs of the other member and are pivotally connected thereto so as to permit relative rotation of said other member on an axis transverse to the overlapping legs, the legs of said one member having arcuate ends formed with angularly spaced notches, the other U-shaped member having a bight portion that is non-circular in transverse section and is recessed axially for receiving a connecting portion of the indicator head, an axially movable plate member encircling the connecting portion, said plate member having opposite end detents depending therefrom adapted to fit into opposing notches on the ends of said overlapping legs, said plate member also having opposite side flanges depending therefrom that fit over the side edges of said bight portion for engagement with opposite side walls of such portion when said detents engage said notches so as to prevent rotation of the plate member relative to said other U-shaped member, and locking means to prevent axial movement of said plate member away from engagement with said other member.

3. Mounting means for a measuring instrument having an indicator head and a rigid supporting stem for said head, said means comprising a relatively fixed member carried by said stem, a relatively movable member carrying said head and pivotally connected to said fixed member for rotation relative thereto on an axis transverse to the axis of the stem, positioning means associated with said fixed and movable members and engageable with each other to selectively set the movable member at positively predetermined angular positions with respect to its pivot axis, and swivel means connecting the head with said movable member for allowing rotation of the head relative to said movable member about an axis perpendicular to said pivot axis, said positioning means including a movable element having means thereon to hold said swivel means in any of a plurality of positively predetermined angular positions when said positioning means are engaged with each other and releasable locking means to hold said positioning means in engagement with each other.

4. Mounting means for a thermometer having an indicator head, a rigid supporting stem having a temperature responsive bulb therein and a flexible tube connecting said bulb with the interior of said head, said means comprising a relatively fixed member carried by said stem, a relatively movable member carrying said head and pivotally connected to said fixed member for rotation on an axis transverse to the axis of said stem, positioning means associated with said fixed and movable members and operably engageable with each other to selectively set the movable member at positively predetermined angular positions with respect to its pivot axis, and swivel means connecting the head with said movable member for allowing rotation of the head relative to said member about an axis perpendicular to said pivot axis, passage means in said fixed and movable members and said swivel means for receiving therethrough the flexible tube, rotation limiting means on said movable member and said swivel means for limiting rotation of said head to less than 180°, said positioning means including a movable element having means thereon to hold said swivel means in any of a plurality of positively predetermined angular positions when said positioning means are operably engaged with each other, and locking means to hold said positioning means in operable engagement with each other.

5. Mounting means for a measuring instrument having an indicator head and a rigid supporting stem, said means comprising a fixed member carried by the stem and having a series of spaced notches therein, a movable member carrying the head and pivotally connected to said fixed member for rotation relative thereto on an axis transverse to the axis of the stem, a centrally open element movable to and from an operative position wherein it engages said movable member, said element having detent means engageable selectively in said notches when said element is moved to its operative position for setting the movable member at positively predetermined angular positions with respect to its pivot axis, swivel means extending through said centrally open element for connecting the head with said movable member to allow rotation of the head relative to said movable member about an axis perpendicular to said pivot axis, position defining means including groove means in the inner peripheral surface of said movable element and outwardly protruding pin means on said swivel means receivable in said groove means when said element is moved to its operative position for positively holding said swivel means relative to said movable member, and locking means to hold said movable element in its operative position.

6. Mounting means for a measuring instrument having an indicator head and a rigid supporting stem, said means comprising a fixed member carried by the stem and having a series of opposed notches on opposite sides of the stem axis, a movable member carrying said head and pivotally connected to said fixed member for rotation on an axis transverse to the stem axis, swivel means connecting the head with said movable member to allow rotation of the head relative to the movable member about an axis perpendicular to said pivot axis, a centrally open plate member surrounding the swivel means and being movable to and from an operative position engaging said movable member, said plate member having opposite end detents depending therefrom and a plurality of grooves formed around its inner periphery, said plate member being shiftable between one operative position in which said detents selectively engage any pair of opposing notches on said fixed member and said grooves define a plurality of angular positions around said swivel means and another position 180° out of phase with said one position in which said detents will also selectively engage any pair of opposing notches and said grooves define a plurality of other angular positions around said swivel means displaced from said first-named angular positions, and locking means to hold said plate member in operative position.

References Cited in the file of this patent
UNITED STATES PATENTS

| | | |
|---|---|---|
| 1,645,023 | Richards | Oct. 11, 1927 |
| 1,733,804 | Ileman | Oct. 29, 1929 |
| 2,330,335 | Collins | Sept. 28, 1943 |
| 2,524,894 | Dobrin | Oct. 10, 1950 |
| 2,594,242 | Wilson | Apr. 22, 1952 |
| 2,693,112 | Beck | Nov. 2, 1954 |
| 2,701,113 | Koonter | Feb. 1, 1955 |

FOREIGN PATENTS

| | | |
|---|---|---|
| 816,111 | France | Apr. 26, 1937 |